Patented Dec. 24, 1935

2,025,369

UNITED STATES PATENT OFFICE 2,025,369

PLASTIC COMPOSITION

Michael J. Batelja, Portland, Oreg.

No Drawing. Application January 11, 1934,
Serial No. 706,294

3 Claims. (Cl. 106—36)

This invention relates to improvements in plastic materials and relates particularly to an improved composition designed primarily for use as a wall surfacing or coating similar to stuccoing.

The primary object of the present invention is to provide a wall surfacing composition having a texture of desirable quality and differing from wall surfacing materials heretofore developed, and at the same time affording a strong water shedding covering.

Another object of the invention is to provide an improved wall surfacing material which may be inexpensively made up and which is easily applied.

Still another object of the invention is to provide a composition which, in addition to forming a desirable wall surfacing, may be employed for molding objects of various forms.

Two formulæ have been developed which employ the basic constituents of the present invention but which have incorporated therewith the different filler preparations. Either of the formulæ forms a satisfactory product for the uses specified.

In the preparation of one formula, the product of which is designed for finishing interior surfaces, the approximate proportions of the ingredients necessary to make up a quantity of finished product necessary to cover approximately 96 sq. in. of surface to a depth of from ¼ to $\frac{5}{16}$ in., comprises 1 lb. of ground oats or oat flour, 12 qts. of water, 6 lbs. of paper, wood or rag pulp and 6 lbs. of a cement of the character prepared from clay and limestone, such as "Portland cement", or plaster of Paris. The oats and water mixture is thoroughly stirred up and the paper pulp, rag or wood pulp is then incorporated and after this, the cement is mixed in, thus giving a mixture of batter-like consistency which may be easily handled and spread with a trowel. If a heavier mixture is desired which can be handled with the hands and molded into various desired shapes, 12 lbs. of cement or plaster of Paris is employed. To the foregoing, containing either 6 or 12 lbs. of cement in combination with the other ingredients, is added ½ lb. powdered litharge, 4 oz. bichromate of potash, and 1 qt. of water-proof varnish or a suitable water-proof oil. There may be used, also, in place of the litharge, ½ pt. of a good liquid dryer. The product of this formula will spread smoothly, when made with 6 lbs. of cement for application with a trowel, without cracking, and can be applied to a wall surface in a thick or relatively thin layer.

If desired, the pulp may be replaced with asbestos and also the formula may be varied slightly by employing half sand and half cement in the mixture instead of all cement as set forth. If a good insulation is desired and the substance is not wanted primarily as a surface finish, the water and oats mixture may have added thereto 8 lbs. of pulp and used without the addition of cement. However, to this mixture may be added 1 qt. of a suitable oil if a water-proof mixture is desired.

The second formula is designed primarily for exterior surfacing and in place of plain water, there is used a water solution of magnesium chloride having a density of approximately 10° Baumé. In employing this solution, the second formula comprises 12 qts. of solution, 1 qt. of pulverized or powdered oats, 1 lb. of plaster or dry slacked lime, ½ lb. casein, 6 lbs. of pulp, either rag, wood or paper, 2½ lbs. of calcined magnesite, 3½ lbs. of powdered silica, 4 oz. of bichromate of potash, ½ lb. litharge or ½ pt. of liquid dryer, 1 qt. of water-proofing varnish or 1 qt. of water-proofing oil. If larger quantities of the product are desired, they will be made up, of course, on the basis of the proportions given.

It is also to be understood that either of these formulæ may have mixed therewith a suitable coloring matter when such is desired, mineral colorings being preferred. Also, in place of the wood pulp or other pulps, sawdust or wood flour may be used.

For obtaining the drying and water-proofing results, linseed or China wood oil or varnish may be employed, as found desirable.

As previously stated, the preparations made up according to either of the formulæ set forth have a texture of novel character and form, strong water-proofing substance which may be used for surfacing, building walls both inside and out or for the manufacture of garden furniture or for any indoor or outdoor construction where plaster or cement has previously been employed.

I claim:—

1. A composition of the character described, comprising a mixture of ground whole oats, and a water solution of magnesium chloride in the proportions of approximately 1 qt. of oats to 12 qts. of solution, the magnesium chloride solution, being approximately 10° Baumé density, lime, casein, a fibrous pulp, calcined magnesite, silica, bichromate of potash, and litharge.

2. A composition of the character described, comprising a mixture of ground whole oats, water, a fibrous pulp of the nature of wood, paper or rag pulp, cement, litharge, bichromate of potash, and a water repellent.

3. A plastic composition, comprising a mixture of ground oats, a fibrous filler, water and a substance having the property of setting after being wetted, combined with litharge, bichromate of potash and a water-proofing substance.

MICHAEL J. BATELJA.